United States Patent
Bodily

(10) Patent No.: US 11,642,923 B2
(45) Date of Patent: May 9, 2023

(54) RECONFIGURABLE TRAILER HITCH

(71) Applicant: Shawn Bodily, Riverton, UT (US)

(72) Inventor: Shawn Bodily, Riverton, UT (US)

(*) Notice: Subject to any disclaimer, the term of this patent is extended or adjusted under 35 U.S.C. 154(b) by 284 days.

(21) Appl. No.: 17/075,275

(22) Filed: Oct. 20, 2020

(65) Prior Publication Data

US 2022/0118804 A1 Apr. 21, 2022

(51) Int. Cl.
| | |
|---|---|
| *B60D 1/06* | (2006.01) |
| *B60D 1/24* | (2006.01) |
| *B60D 1/50* | (2006.01) |
| *B60D 1/167* | (2006.01) |

(52) U.S. Cl.
CPC ............ *B60D 1/065* (2013.01); *B60D 1/167* (2013.01); *B60D 1/247* (2013.01); *B60D 1/50* (2013.01)

(58) Field of Classification Search
CPC ........ B60D 1/065; B60D 1/167; B60D 1/247; B60D 1/50; B60D 1/06
See application file for complete search history.

(56) References Cited

U.S. PATENT DOCUMENTS

| | | | |
|---|---|---|---|
| 4,049,288 A | 9/1977 | Young | |
| 4,202,562 A * | 5/1980 | Sorenson | B60D 1/247 280/415.1 |
| 4,211,427 A | 7/1980 | Young et al. | |
| 5,375,867 A | 12/1994 | Kass et al. | |
| 5,465,991 A | 11/1995 | Kass et al. | |
| 5,562,298 A | 10/1996 | Kass et al. | |
| 5,868,414 A | 2/1999 | McCoy et al. | |
| 5,890,726 A | 4/1999 | McCoy et al. | |
| 5,984,341 A | 11/1999 | Kass et al. | |
| 6,142,500 A | 11/2000 | Sargent | |
| 6,299,191 B1 | 10/2001 | Sargent | |
| 6,419,257 B1 | 7/2002 | McCoy et al. | |
| 6,536,793 B2 | 3/2003 | Sargent | |
| 8,186,702 B2 | 5/2012 | McCoy et al. | |
| 8,328,222 B1 | 12/2012 | Roeber et al. | |
| 8,641,075 B1 * | 2/2014 | Angel | B60D 1/30 280/484 |
| 8,789,842 B2 | 7/2014 | Williams, Jr. et al. | |
| 8,985,611 B1 * | 3/2015 | Angel | B60D 1/247 280/405.1 |
| 9,579,940 B2 | 2/2017 | Mauerman et al. | |
| 10,183,536 B2 | 1/2019 | McCoy et al. | |
| 10,675,931 B2 | 6/2020 | Anderson | |
| 10,875,368 B1 * | 12/2020 | Angel | B60D 1/325 |

(Continued)

*Primary Examiner* — Jacob D Knutson
*Assistant Examiner* — Abigail R Hymel
(74) *Attorney, Agent, or Firm* — Jason R. Jones

(57) ABSTRACT

A trailer hitch assembly includes a shank, coupleable to a receiver carried by a towing vehicle. A ball attachment bracket is attachable to the shank. A ball assembly is receivable within the ball attachment bracket, the ball assembly capable of mating with a trailer coupler carried by a trailer to be towed. A distribution block is attachable to one or both the ball attachment bracket or the shank. The distribution block has arm socket attachments to allow coupling of a pair of arm sockets to the distribution block, each of the arm sockets capable of receiving one of a pair of spring arms attachable to the trailer to be towed. The distribution block is removable from each of the ball attachment bracket and the shank while the ball attachment bracket remains operably coupled to the shank for use as a standard ball hitch assembly.

17 Claims, 7 Drawing Sheets

(56) References Cited

U.S. PATENT DOCUMENTS

| | | | |
|---|---|---|---|
| 2003/0042703 A1* | 3/2003 | Valliere | B60D 1/143 |
| | | | 280/406.1 |
| 2004/0222614 A1 | 11/2004 | Lindenman et al. | |
| 2015/0102581 A1* | 4/2015 | Schwennsen | B60D 1/52 |
| | | | 280/407 |
| 2019/0152280 A1 | 5/2019 | McCoy et al. | |

* cited by examiner

RECONFIGURABLE TRAILER HITCH

BACKGROUND OF THE INVENTION

Field of the Invention

The present invention relates generally to trailer hitches for use in towing trailers with vehicles.

Related Art

Many different types of trailer hitches are known in the art that allow a powered vehicle to securely engage a non-powered trailer to tow the trailer behind the vehicle. Perhaps the most common trailer hitch is a simple ball mount that is attached to the frame or bumper of the vehicle. To use this hitch, a trailer is fitted with a socket that fits securely over the ball mount and includes retaining structure that prevents the socket from moving upwardly relative to the ball mount. This arrangement provides a secure connection between the trailer and the vehicle while also allowing the trailer to articulate relative to the vehicle.

While such ball hitches function well, they are susceptible to problems relating to the relationship between the tongue weight of the trailer being towed and the load rating of the powered vehicle. If the tongue weight of the trailer is much greater than the load capacity of the vehicle, the front end of the vehicle tends to be lifted into the air by the trailer. This results in a situation that is less than desirable from a safety and performance perspective.

Due to these issues, weight-distribution trailer hitches were developed that, once properly installed, better distribute the tongue weight of the trailer to the axles of the vehicle. This results in a safer, higher-performance mating between the vehicle and the trailer. While such weight-distribution trailer hitches are now well known, they can be very complicated and heavy devices. Despite this, most operators recognize that weight-distribution hitches should be used where necessary. However, many operators would prefer not to use these heavy and complex hitches when unnecessary, as the standard ball mount hitch is a much simpler arrangement. To date, however, operators have generally had to choose between the two.

SUMMARY OF THE INVENTION

In accordance with one aspect of the technology, a trailer hitch assembly is provided, including a shank, coupleable to a receiver carried by a towing vehicle. A ball attachment bracket can be attachable to the shank. A ball assembly can be receivable within the ball attachment bracket. The ball assembly can be capable of mating with a trailer coupler carried by a trailer to be towed. A distribution block can be attachable to one or both the ball attachment bracket or the shank. The distribution block can have arm socket attachments to allow coupling of a pair of arm sockets to the distribution block. Each of the arm sockets can be capable of receiving one of a pair of spring arms attachable to the trailer to be towed. The distribution block can be removable from each of the ball attachment bracket and the shank while the ball attachment bracket remains operably coupled to the shank for use as a standard ball hitch assembly.

In accordance with another aspect of the technology, a trailer hitch assembly is provided, including a shank, coupleable to a receiver carried by a towing vehicle. A ball attachment bracket can be attachable to the shank. A ball assembly can be receivable within the ball attachment bracket, the ball assembly capable of mating with a trailer coupler carried by a trailer to be towed. A distribution block can be attachable to one or both the ball attachment bracket or the shank. The distribution block can include arm socket attachments to allow coupling of a pair of arm sockets to the distribution block, each of the arm sockets capable of receiving one of a pair of spring arms attachable to the trailer to be towed. The distribution block can be removable from each of the ball attachment bracket and the shank while the ball attachment bracket remains operably coupled to the shank for use as a standard ball hitch assembly. The ball attachment bracket can include a shank receiving space bounded by a pair of ball attachment bracket sidewalls. Each ball attachment bracket sidewall can contain at least one pin opening formed therethrough, the pin opening operable to receive a pin therethrough. The distribution block can include a pair of distribution block sidewalls, each distribution block sidewall containing at least one pin opening formed therethrough. The pin openings in the ball attachment bracket sidewalls can align with the pin openings in the distribution block sidewalls when the ball attachment bracket is installed in the ball attachment bracket receiving space of the distribution block.

In accordance with another aspect of the technology, a trailer hitch assembly is provided, including a shank, coupleable to a receiver carried by a towing vehicle. A ball attachment bracket can be attachable to the shank. The ball attachment bracket can include a pair of ball attachment bracket sidewalls forming a shank receiving space, the shank being positionable in the shank receiving space. A pair of pin openings can be formed in each of the ball attachment bracket sidewalls, the pin openings operable to receive a pin to pin the ball attachment bracket to the shank. A ball assembly can be receivable within the ball attachment bracket, the ball assembly capable of mating with a trailer coupler carried by a trailer to be towed. A distribution block can be attachable to one or both the ball attachment bracket or the shank. The distribution block can have arm socket attachments to allow coupling of a pair of arm sockets to the distribution block, each of the arm sockets capable of receiving one of a pair of spring arms attachable to the trailer to be towed. The distribution block can include a pair of overhanging shoulders and a pair of underhanging shoulders that collectively define a ball attachment bracket receiving space. The ball attachment bracket can be positionable within the ball attachment bracket receiving space such that the ball attachment bracket is restricted from vertical movement relative to the distribution block when the ball attachment bracket is positioned within the ball attachment bracket receiving space. The distribution block can include a pair of distribution block sidewalls, each distribution block sidewall containing at least one pin opening formed therethrough and one slot opening formed therein. The pin openings in the ball attachment bracket sidewalls can align with one pair of pin openings in the distribution block sidewalls when the ball attachment bracket is installed in the ball attachment bracket receiving space of the distribution block. The slot openings can align with another pair of pin openings in the ball attachment bracket sidewalls when the ball attachment bracket is installed in the ball attachment bracket receiving space of the distribution block. The slot openings can allow the distribution block to slide relative to the ball attachment bracket when the ball attachment bracket is pinned to the shank. The distribution block can be removable from each of the ball attachment bracket and the shank while the ball attachment bracket remains operably coupled to the shank to allow use of the trailer hitch assembly as a standard ball hitch assembly.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
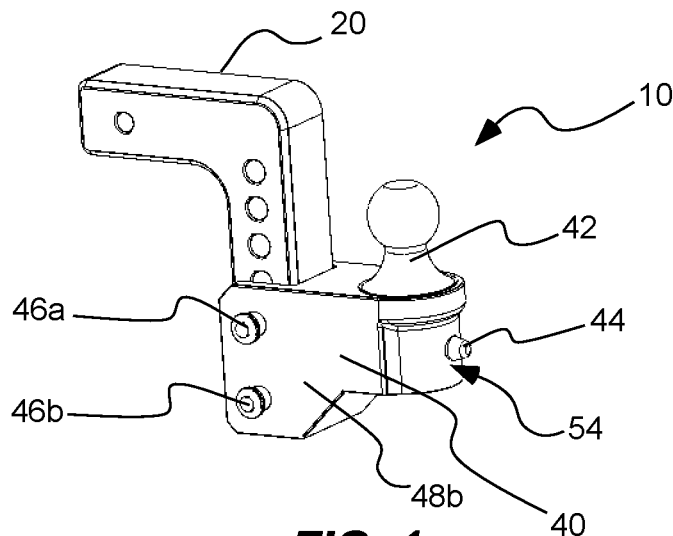
FIG. 1 is a perspective view of a ball hitch assembly in accordance with an embodiment of the technology.
Figure 2:
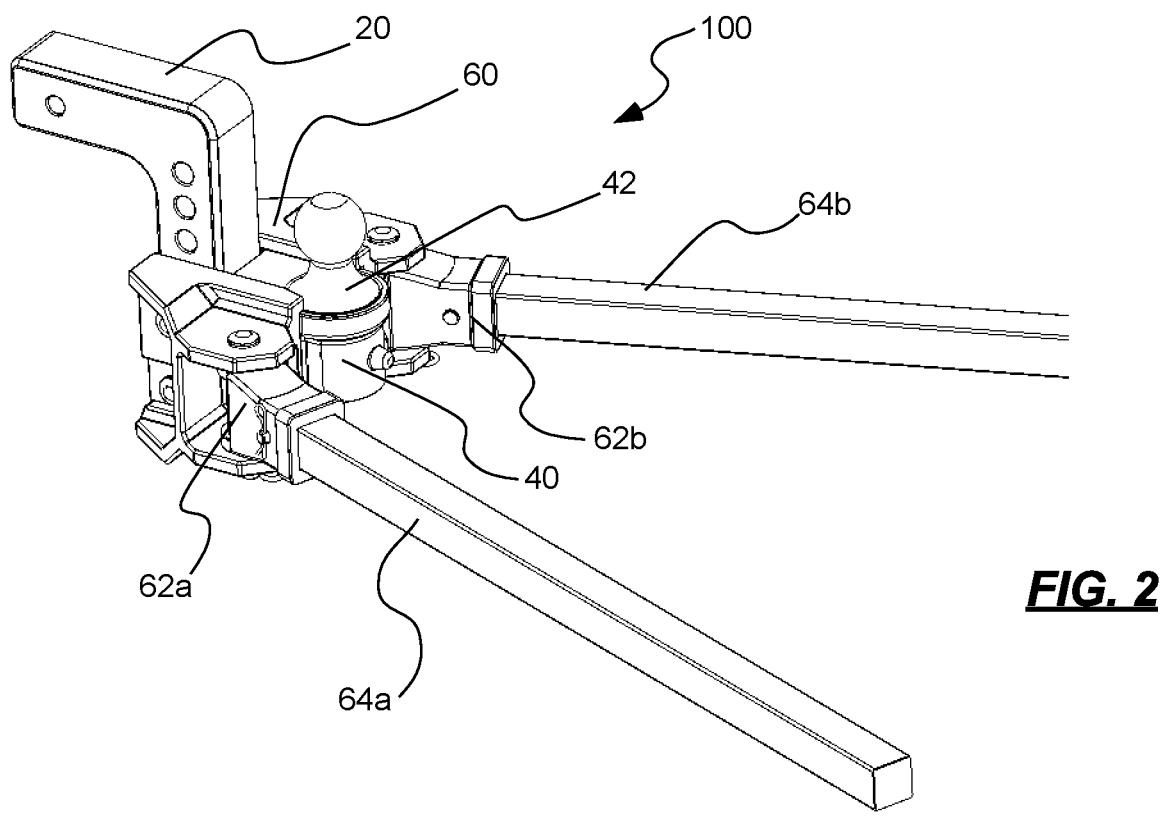
FIG. 2 is a perspective view of a weight distribution hitch in accordance with the present technology that includes the ball hitch assembly of FIG. 1.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "a pin" can include one or more of such pins, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms can sometimes be used herein to describe and claim various components of the present invention. Such terms include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art in the context of this disclosure. For example, it is understood in the art that a towing vehicle is positioned forwardly of the trailer, and, conversely, that the trailer is positioned rearwardly of the vehicle. When terms such as "vertical," "horizontal," "upwardly," "downwardly," etc., are used, they are used relative to a system as it would be commonly understood when installed on a vehicle and/or trailer. For example, any trailer hitch system is commonly understood to be positioned above or over the pavement or other road surface when installed on a vehicle and/or trailer. The road surface is generally understood to be horizontal in the discussion that follows.

Various items or components are discussed herein as being "attached" or "coupled" to one another. In some instances, two components can be directly coupled one to another: in this situation, it is understood that there is no intervening or intermediate structure between these two referenced components. For example, the ball attachment bracket can be attached directly to the shank and the distribution block can be attached directly to the ball attachment bracket. In this instance, the distribution block is considered to be attached directly to the ball attachment bracket, even if pins that couple the distribution block and ball attachment to one another also pass through the shank. In other words, the distribution block and the shank do not contact one another.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to trailer hitch system that can be easily and quickly adapted for use as both a standard ball hitch assembly and a weight distribution assembly. The system can be adapted from one condition to another using only very rudimentary tools and in a very short period of time. When practical, the system allows a user to quickly remove the more cumbersome and complex constituents of the weight distribution hitch and utilize the remaining ball hitch mount.

Figure 3:
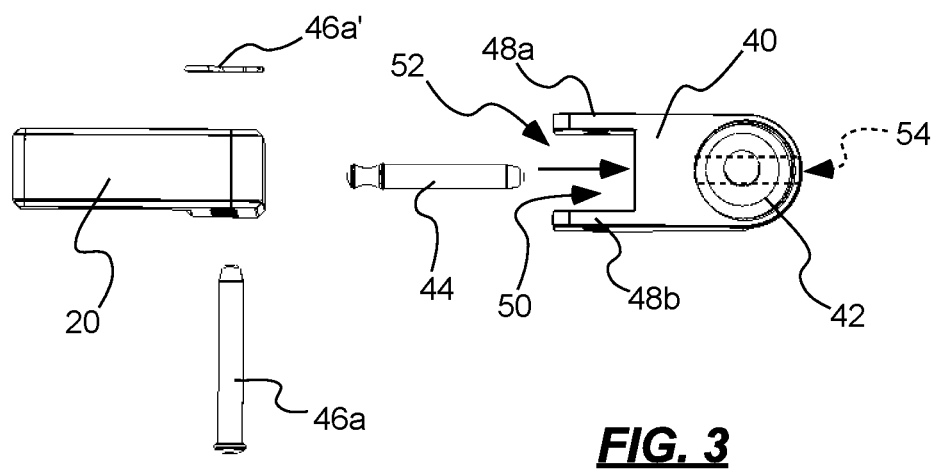
FIG. 3 is a top, partially exploded view of the ball hitch assembly of FIG. 1.

As shown generally in FIGS. 1 and 3, in one aspect the technology provides a standard ball mount hitch 10 that can be attached to a towing vehicle (not shown) via shank 20. In a common application, shank 20 would be inserted within a receiver (not shown) that is securely attached to the frame or bumper of the towing vehicle. The hitch 10 can include all components necessary to serve as a ball mount hitch, including a ball assembly 42. The ball assembly is engaged by a trailer coupler (not shown) of a trailer in the usual manner. The ball assembly can be coupled to a ball attachment bracket 40 via ball attachment pin 44. The ball attachment bracket 40 can be coupled to the shank 20 via pins 46a, 46b.

As shown in more detail in FIG. 3, the ball attachment bracket 40 can include a pair of sidewalls 48a, 48b that collectively form a shank receiving space 50. The shank 20 can be positionable in the shank receiving space to provide a manner by which the ball attachment bracket can be attached to the shank. In one example, the shank receiving space includes an opening 52 through which the shank can pass while the shank is coupled to the towing vehicle. In other words, the ball attachment bracket can be installed over or onto the shank without requiring that the shank be removed from the vehicle's receiving block. In this manner, the installation can begin with installing the shank to the vehicle; or, the shank can simply be carried by the vehicle and the ball attachment bracket can be installed on the shank when it is desired to install the ball mount hitch 10.

The ball attachment bracket 40 can include one or more ball pin openings 54 through which the ball pin 44 can be inserted through the ball attachment bracket 40 into the ball assembly 54. In this manner, the ball assembly can be securely coupled to the ball attachment bracket. The ball pin can be insertable through the opening 52 in the shank receiving space 50 such that the ball pin is prevented from being removed by the shank when the ball attachment bracket is attached to the shank. The ball pin and ball pin opening can be formed such that rearward movement of the pin relative to the bracket (e.g., to the right of FIG. 3) is prohibited once the pin is seated in the position shown in FIG. 1. In this manner, once the ball attachment bracket is securely seated around the shank, the ball pin cannot be removed from the ball assembly.

It is noted that pin 46a is shown in FIG. 3 having corresponding retaining clip 46a' which serves to retain the pin in position through the ball attachment bracket 40 and shank 20 (and, as discussed in further detail below, distribution block 60). The function and usage of such pins is well known in the art and will not be described in detail for the various components of the present technology. Any of the pins shown herein can be a typical pin with retaining clip, as shown, or so-called "quick-release" pins, shackle pins, cotter pins, split pins, pins that engage threaded nuts or recesses, etc. Generally speaking, however, the pins used throughout the present technology can be quickly and easily engaged and disengaged by a user to provide functionality that does not require advanced or sophisticated tools.

Figure 4:
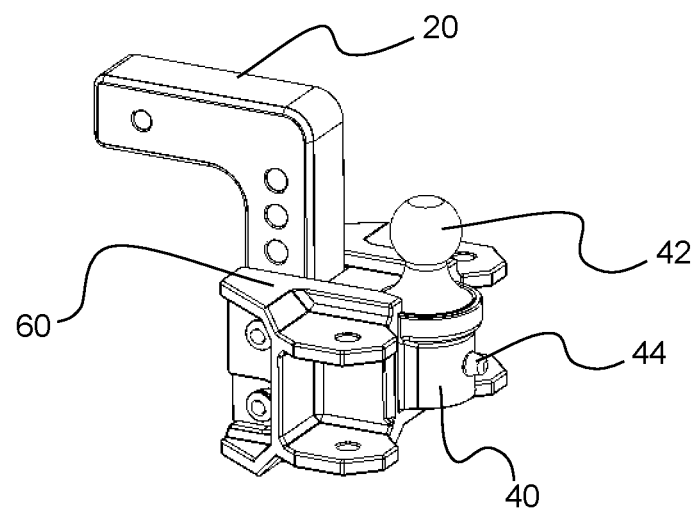
FIG. 4 is a perspective view of the ball hitch assembly of FIG. 1, after a distribution block has been coupled thereto.

The ball mount hitch 10 shown in FIG. 1 can be fully functional as a standard trailer hitch when the tongue weight of the trailer is relatively low compared to the weight capacity of the vehicle. When the tongue weight is much higher, a user can readily adapt the installation shown in FIG. 1 to include all of the components of the weight distribution hitch 100 shown in FIGS. 2 and 8 through 13. This hitch includes the shank 20, the ball attachment bracket 40 and the ball assembly 42, as well as the various pins 46a, 46b, 44, etc. In addition, the hitch 100 includes a distribution block 60 (shown in more detail in FIGS. 4 through 6) that can be coupled to either or both the shank 20 and the ball attachment bracket 40. The distribution block can carry a pair of arm socket attachment points, which can each be configured to receive an arm socket 62a, 62b. The arm sockets can each receive a spring arm, 64a, 64b, respectively. The spring arms can be coupled to the trailer in much the same manner of known weight distribution hitch systems.

Figure 5:
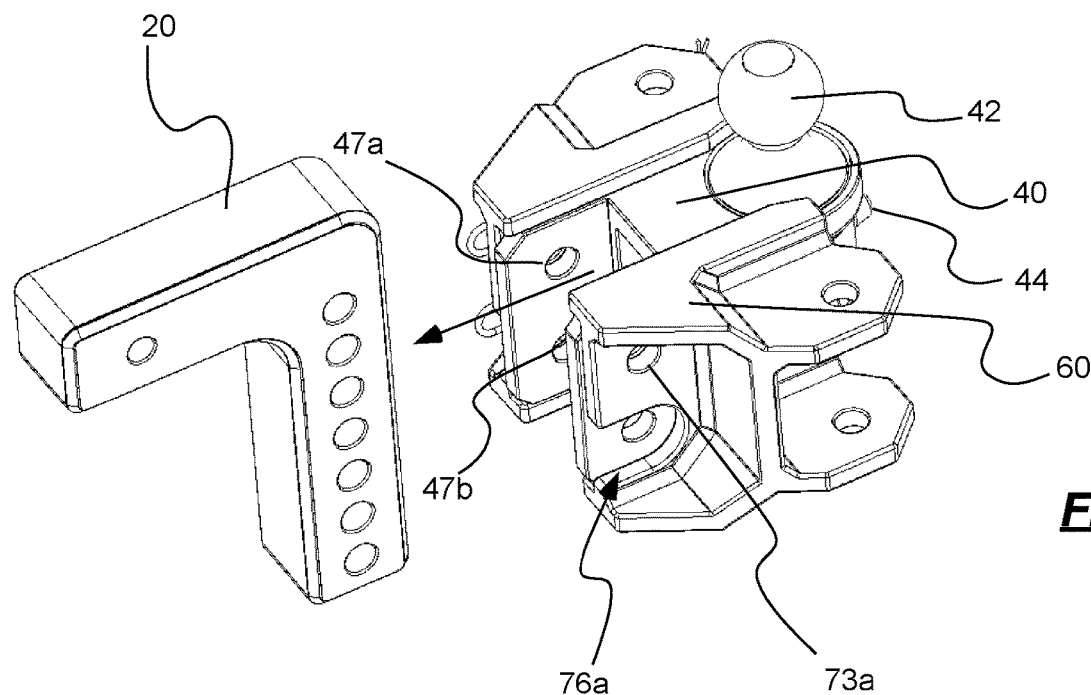
FIG. 5 is an exploded view of the ball attachment bracket and distribution block of FIG. 4.
Figure 6:
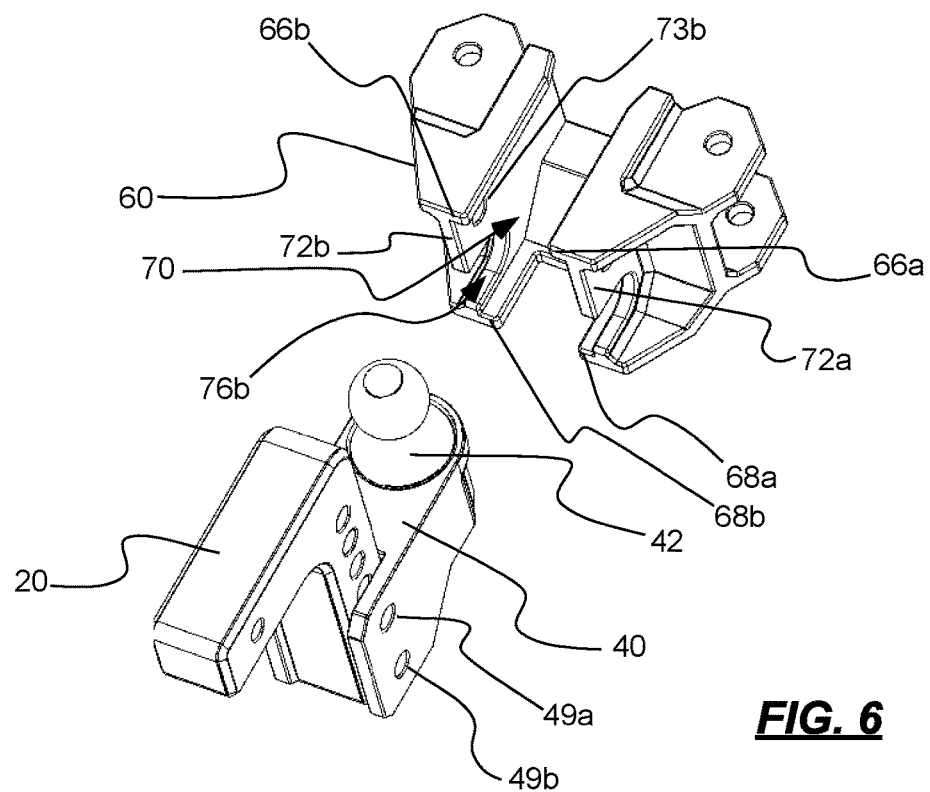
FIG. 6 is another perspective view of the ball attachment bracket and distribution block of FIG. 5.
Figure 7:
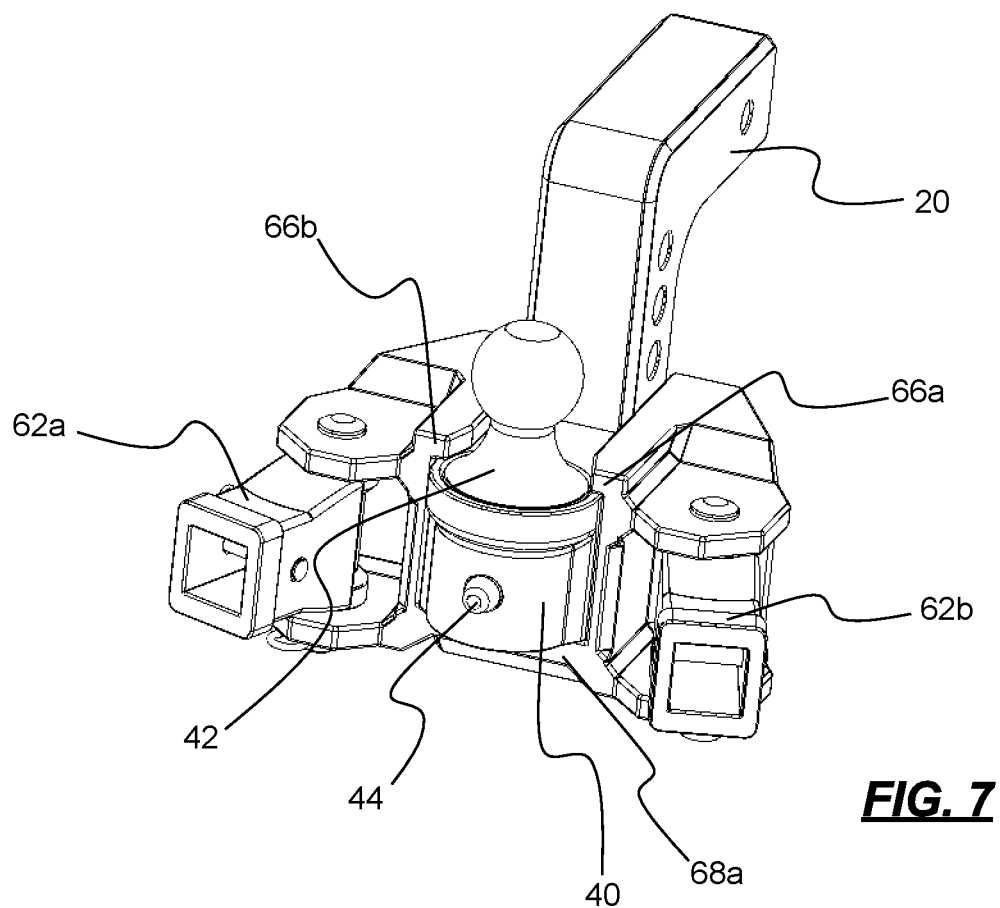
FIG. 7 is a perspective view of the ball attachment bracket and distribution block of FIG. 4, with arm sockets being carried by the distribution block.
Figure 8:
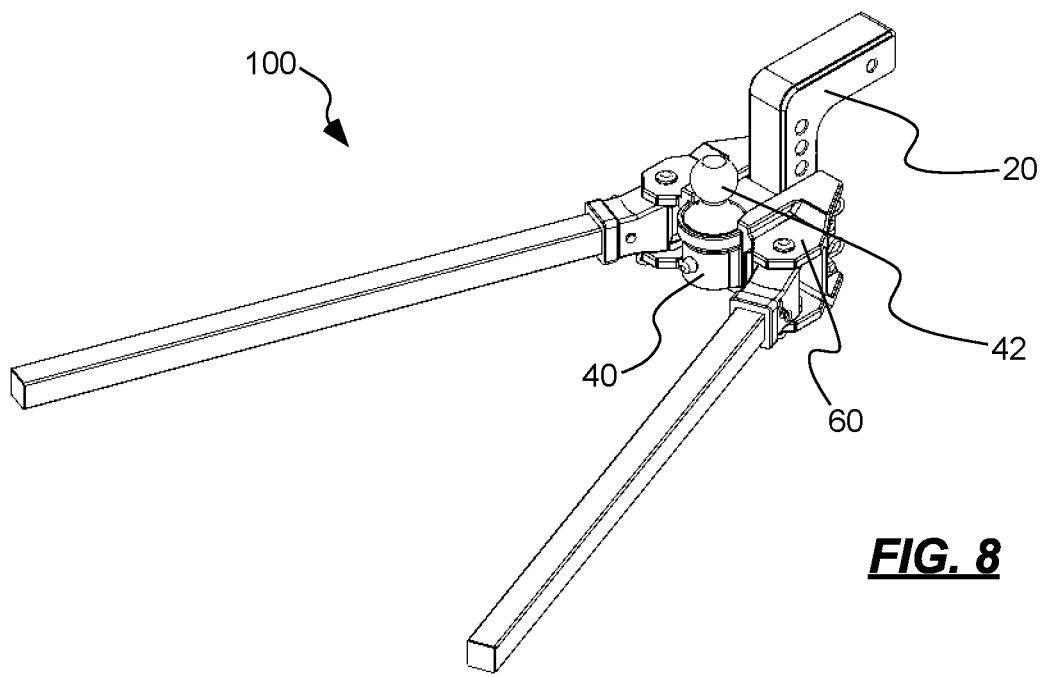
FIG. 8 is another perspective view of the weight distribution hitch of FIG. 2.
Figure 9:
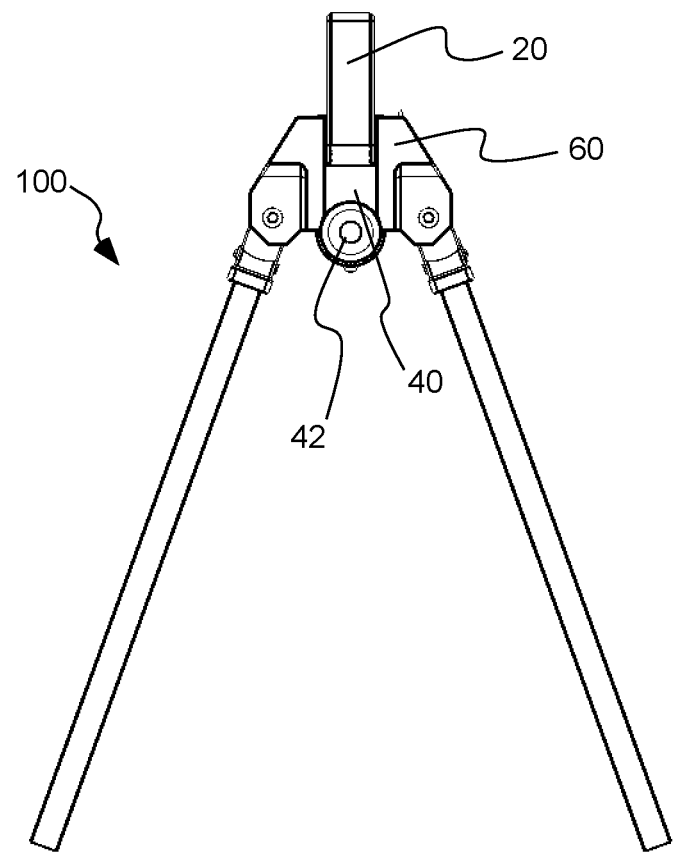
FIG. 9 is a top view of the weight distribution hitch of FIG. 2.
Figure 10:
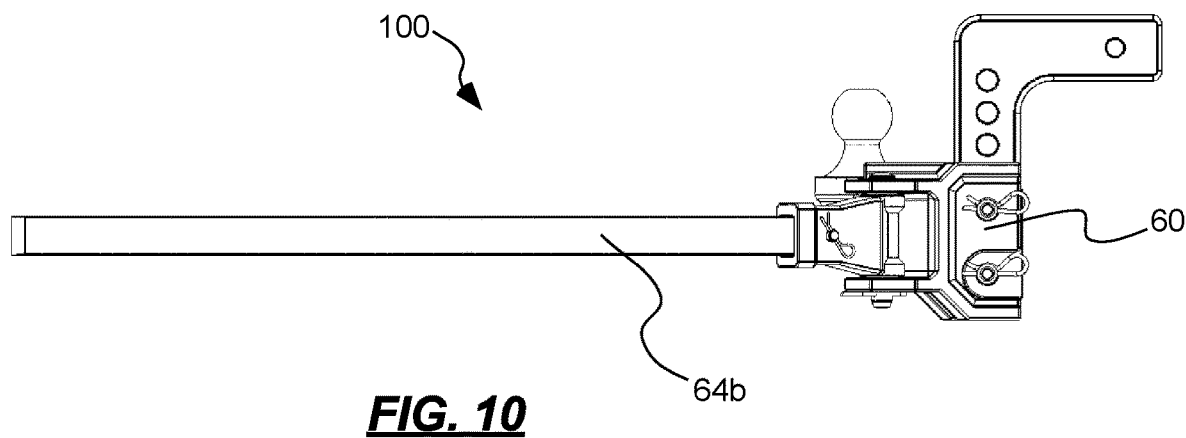
FIG. 10 is a side view of the weight distribution hitch of FIG. 2.
Figure 11:
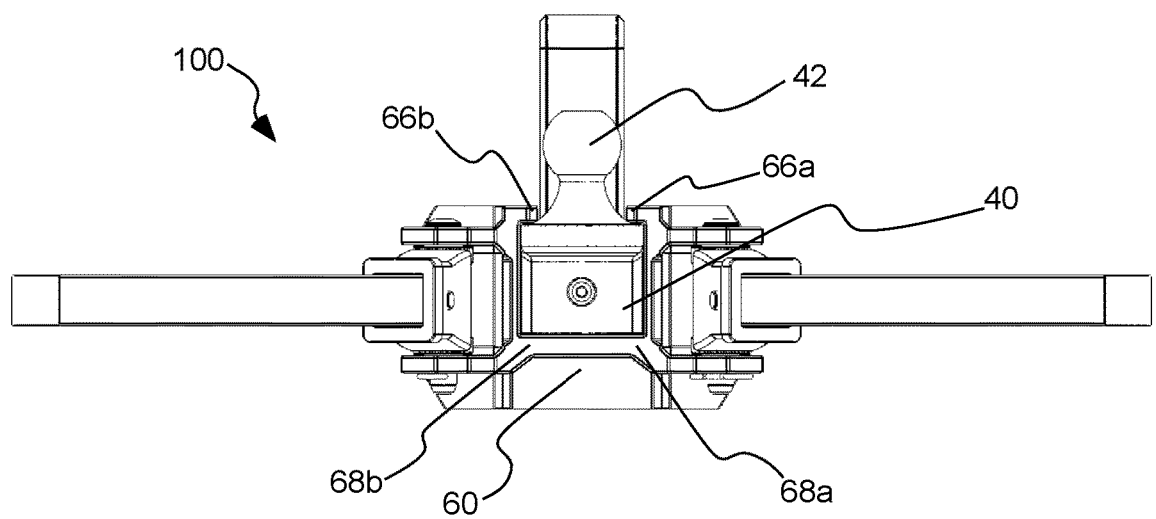
FIG. 11 is a rear view of the weight distribution hitch of FIG. 2.
Figure 12:
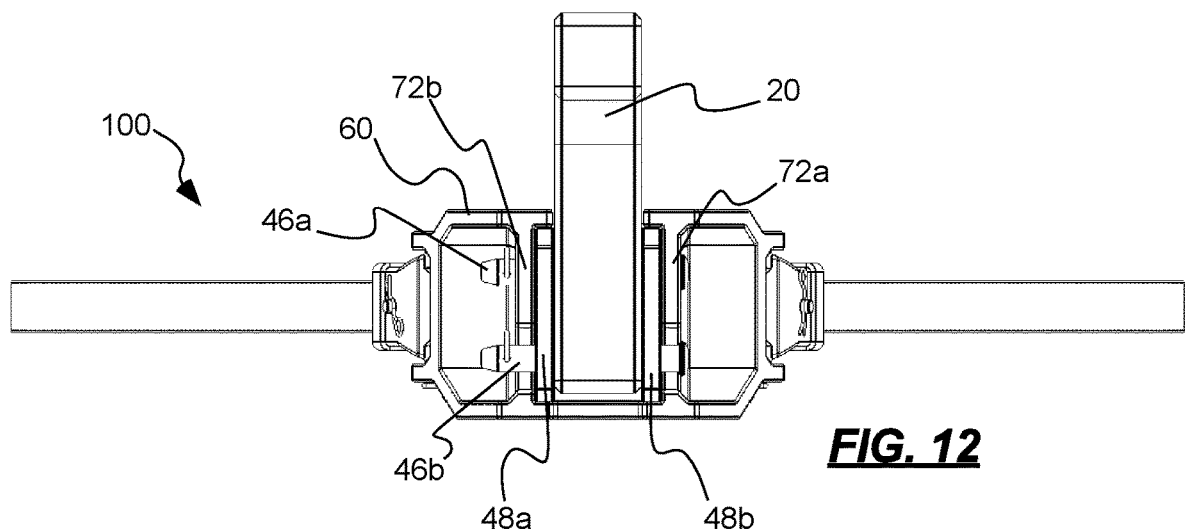
FIG. 12 is a front view of the weight distribution hitch of FIG. 2.
Figure 13:
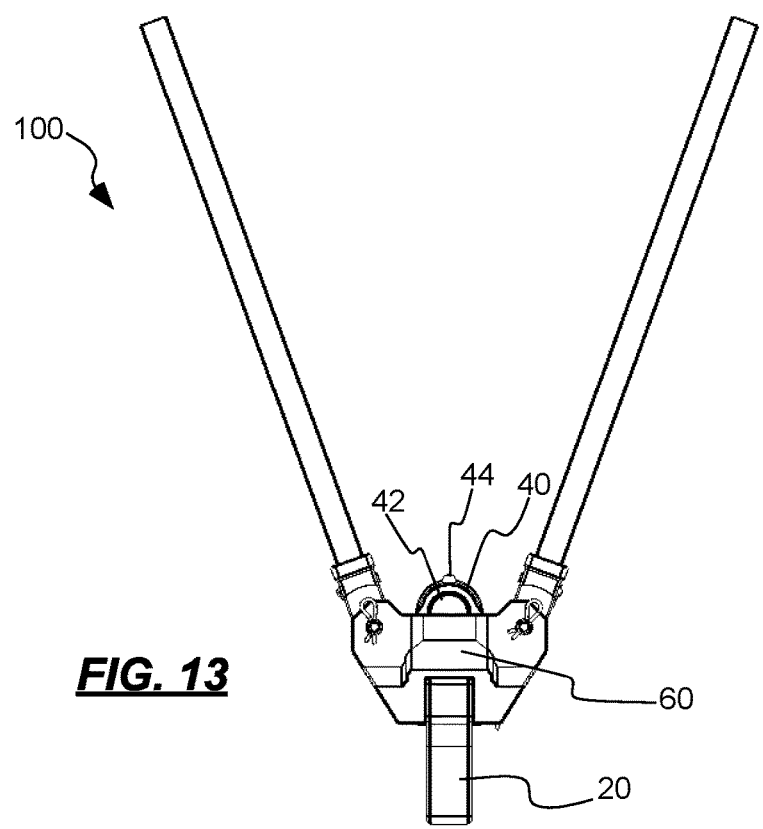
FIG. 13 is a bottom view of the weight distribution hitch of FIG. 2.

As shown in FIGS. 5 and 6, the distribution block 60 can be removable from each of the ball attachment bracket 40 and the shank 20 while the ball attachment bracket remains operably coupled to the shank for use as a standard ball hitch assembly (e.g., the configuration shown at 10 in FIG. 1). The distribution block can include a pair of overhanging shoulders 66a, 66b and a pair of underhanging shoulders 68a, 68b. The overhanging and underhanging shoulders can collectively define a ball attachment bracket receiving space 70. The ball attachment bracket 40 can be positionable within the ball attachment bracket receiving space to secure the ball attachment bracket within the distribution block (or, conversely, to secure the distribution block about the ball attachment bracket).

The ball attachment bracket 40 can be restricted by the shoulders 66a, 66b, 68a, 68b, from vertically moving relative to the distribution block 60 when the ball attachment bracket is received within the ball attachment bracket receiving space 70. In this manner, only relative sliding motion between the ball attachment bracket and the distribution block need be restricted after installation to ensure a stable connection. This can be accomplished by pinning the ball attachment bracket and distribution block one to another. To accommodate this, the ball attachment bracket sidewalls 48a, 48b can each include at least one pin opening formed therethrough: in the examples shown, each sidewall contains two pin openings, two of which are shown by example in FIG. 5 at 47a, 47b, and two of which are shown in FIG. 6 at 49a, 49b. Each of the pin openings can be operable to receive a pin therethrough.

Similarly, the distribution block 60 can include a pair of distribution block sidewalls 72a, 72b, each of which can include at least one pin opening 73a, 73b, respectively, formed therethrough (see FIGS. 5 and 6). The pin openings 47a, 49a, in the ball attachment bracket sidewalls 48a, 48b, can be aligned with the pin openings 73a, 73b, in the distribution block sidewalls 72a, 72b when the ball attachment bracket 40 is installed in the ball attachment bracket receiving space 70 of the distribution block 60.

In one aspect of the technology, instead of including a further pair of pin openings in the distribution block sidewalls 72a, 72b, a pair of slot openings 76a, 76b (see FIGS. 5 and 6) can be formed in the distribution block sidewalls. These slot openings can align with the pin openings 47b, 49b, in the ball attachment bracket sidewalls when the ball attachment bracket is installed in the ball attachment bracket receiving space of the distribution block. The slot openings can allow the distribution block to slide relative to the ball attachment bracket when the ball attachment bracket is pinned to the shank. In this manner, the ball attachment bracket can be temporarily held in position on the shank via a pin through holes 47b, 49b. The slot openings can then be slid over the pin holding the ball attachment bracket in place, and a pin can be inserted into and through holes 47a, 49a, 73a and 73b, pinning both of the ball attachment bracket and distribution block to the shank. Note that in this instance, the distribution block is considered attached to the ball attachment bracket, despite the fact that the pins extend through the distribution block and the shank.

Once fully assembled as shown in FIGS. 2 and 8-13, the weight distribution hitch 100 can fully serve to properly distribute the weight of the trailer to the axles of the vehicle, as is accomplished by conventional weight distribution hitches. When desired, however, it is a simple job for an operator to remove the distribution block and accompanying structure and quickly reduce the trailer hitch to the operable components shown in FIG. 1.

In addition to the structure outlined above, the present technology also provides various methods of manufacturing trailer hitches and trailer hitch components; various methods of configuring such components and various methods of installing and disassembling such components.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. A trailer hitch assembly, comprising:
   a shank, coupleable to a receiver carried by a towing vehicle;
   a ball attachment bracket, attachable to the shank;
   a ball assembly, receivable within the ball attachment bracket, the ball assembly capable of mating with a trailer coupler carried by a trailer to be towed; and
   a distribution block, attachable to one or both the ball attachment bracket or the shank, the distribution block having arm socket attachments to allow coupling of a pair of arm sockets to the distribution block, each of the arm sockets capable of receiving one of a pair of spring arms attachable to the trailer to be towed;
   the distribution block being removable from each of the ball attachment bracket and the shank while the ball attachment bracket remains operably coupled to the shank for use as a standard ball hitch assembly;
   a ball attachment bracket receiving space bounded by a pair of ball attachment bracket sidewalls, and wherein each ball attachment bracket sidewall contains at least one pin opening formed therethrough, the pin opening operable to receive a pin therethrough;
   the distribution block including a pair of distribution block sidewalls, each distribution block sidewall containing at least one pin opening formed therethrough, the pin openings in the ball attachment bracket sidewalls aligning with the pin openings in the distribution block sidewalls when the ball attachment bracket is installed in the ball attachment bracket receiving space of the distribution block.

2. The assembly of claim 1, further comprising a slot opening formed in each of the distribution block sidewalls, the slot openings aligning with at least one pin opening in the ball attachment bracket sidewalls when the ball attachment bracket is installed in the ball attachment bracket receiving space of the distribution block; the slot openings allowing the distribution block to slide relative to the ball attachment bracket when the ball attachment bracket is pinned to the shank.

3. The assembly of claim 1, wherein the distribution block includes a pair of overhanging shoulders and a pair of underhanging shoulders that collectively define the ball attachment bracket receiving space, the ball attachment bracket being positionable within the ball attachment bracket receiving space.

4. The assembly of claim 3, wherein the ball attachment bracket is restricted from vertically moving relative to the distribution block when the ball attachment bracket is received within the ball attachment bracket receiving space.

5. The assembly of claim 1, wherein the ball attachment bracket includes a pair of side arms forming a shank receiving space, the shank being positionable in the shank receiving space.

6. The assembly of claim 5, wherein the shank receiving space includes an opening through which the shank can pass while the shank is coupled to the towing vehicle.

7. The assembly of claim 6, wherein the ball attachment bracket includes one or more ball pin openings through which a ball pin can be inserted through the ball attachment bracket into the ball assembly, the ball pin being insertable through the shank receiving space such that the ball pin is prevented by the shank from being removed when the ball attachment bracket is attached to the shank.

8. A trailer hitch assembly, comprising:
   a shank, coupleable to a receiver carried by a towing vehicle;
   a ball attachment bracket, attachable to the shank, the ball attachment bracket including a pair of ball attachment bracket sidewalls forming a shank receiving space, the shank being positionable in the shank receiving space;
   a pair of pin openings formed in each of the ball attachment bracket sidewalls, the pin openings operable to receive a pin to pin the ball attachment bracket to the shank;
   a ball assembly, receivable within the ball attachment bracket, the ball assembly capable of mating with a trailer coupler carried by a trailer to be towed; and
   a distribution block, attachable to one or both of the ball attachment bracket or the shank, the distribution block having arm socket attachments to allow coupling of a pair of arm sockets to the distribution block, each of the arm sockets capable of receiving one of a pair of spring arms attachable to the trailer to be towed;
   the distribution block including a pair of overhanging shoulders and a pair of underhanging shoulders that collectively define a ball attachment bracket receiving space, the ball attachment bracket being positionable within the ball attachment bracket receiving space such that the ball attachment bracket is restricted from vertical movement relative to the distribution block when the ball attachment bracket is positioned within the ball attachment bracket receiving space;

the distribution block including a pair of distribution block sidewalls, each distribution block sidewall containing at least one pin opening formed therethrough and one slot opening formed therein, the pin openings in the ball attachment bracket sidewalls aligning with one pair of pin openings in the distribution block sidewalls when the ball attachment bracket is installed in the ball attachment bracket receiving space of the distribution block, and the slot openings aligning with another pair of pin openings in the ball attachment bracket sidewalls when the ball attachment bracket is installed in the ball attachment bracket receiving space of the distribution block; the slot openings allowing the distribution block to slide relative to the ball attachment bracket when the ball attachment bracket is pinned to the shank;

the distribution block being removable from each of the ball attachment bracket and the shank while the ball attachment bracket remains operably coupled to the shank to allow use of the trailer hitch assembly as a standard ball hitch assembly.

9. The assembly of claim 8, wherein the ball attachment bracket includes one or more ball pin openings through which a ball pin can be inserted through the ball attachment bracket, the ball pin being insertable through the shank receiving space, such that the ball pin is prevented by the shank from being removed when the ball attachment bracket is attached to the shank.

10. A trailer hitch assembly, comprising:
a shank, coupleable to a receiver carried by a towing vehicle;
a ball attachment bracket, attachable to the shank;
a ball assembly, receivable within the ball attachment bracket, the ball assembly capable of mating with a trailer coupler carried by a trailer to be towed; and
a distribution block, attachable to one or both the ball attachment bracket or the shank, the distribution block having arm socket attachments to allow coupling of a pair of arm sockets to the distribution block, each of the arm sockets capable of receiving one of a pair of spring arms attachable to the trailer to be towed;
the distribution block being removable from each of the ball attachment bracket and the shank while the ball attachment bracket remains operably coupled to the shank for use as a standard ball hitch assembly; wherein
the distribution block includes a pair of overhanging shoulders and a pair of underhanging shoulders that collectively define a ball attachment bracket receiving space, the ball attachment bracket being positionable within the ball attachment bracket receiving space.

11. The assembly of claim 10, wherein the ball attachment bracket includes a pair of ball attachment bracket sidewalls forming a shank receiving space, the shank being positionable in the shank receiving space.

12. The assembly of claim 11, wherein the shank receiving space includes an opening through which the shank can pass while the shank is coupled to the towing vehicle.

13. The assembly of claim 12, wherein the ball attachment bracket includes one or more ball pin openings through which a ball pin can be inserted through the ball attachment bracket into the ball assembly, the ball pin being insertable through the opening in the shank receiving space such that the ball pin is prevented by the shank from being removed when the ball attachment bracket is attached to the shank.

14. The assembly of claim 10, wherein the ball attachment bracket is restricted from vertically moving relative to the distribution block when the ball attachment bracket is received within the ball attachment bracket receiving space.

15. The assembly of claim 10, where the ball attachment bracket receiving space is bounded by a pair of ball attachment bracket sidewalls, and wherein each ball attachment bracket sidewall contains at least one pin opening formed therethrough, the pin opening operable to receive a pin therethrough.

16. The assembly of claim 15, wherein the distribution block includes a pair of distribution block sidewalls, each distribution block sidewall containing at least one pin opening formed therethrough, the pin openings in the ball attachment bracket sidewalls aligning with the pin openings in the distribution block sidewalls when the ball attachment bracket is installed in the ball attachment bracket receiving space of the distribution block.

17. The assembly of claim 15, further comprising a slot opening formed in each of the distribution block sidewalls, the slot openings aligning with a pin opening in the ball attachment bracket sidewalls when the ball attachment bracket is installed in the ball attachment bracket receiving space of the distribution block; the slot openings allowing the distribution block to slide relative to the ball attachment bracket when the ball attachment bracket is pinned to the shank.

* * * * *